(12) United States Patent
Iwase et al.

(10) Patent No.: US 7,473,864 B2
(45) Date of Patent: Jan. 6, 2009

(54) WELDMENT OF DIFFERENT MATERIALS AND RESISTANCE SPOT WELDING METHOD

(75) Inventors: Tetsu Iwase, Fujisawa (JP); Seiji Sasabe, Fujisawa (JP); Mitsuo Hino, Tokyo (JP); Kensuke Tsubota, Tokyo (JP); Fumihiro Sato, Moka (JP); Shunichi Hashimoto, Kakogawa (JP); Jun Katoh, Kobe (JP); Hiroyuki Takeda, Kobe (JP)

(73) Assignees: Kobe Steel, Ltd., Kobe-shi (JP); Nisshin Steel Co., Ltd., Tokyo (JP)

( * ) Notice: Subject to any disclaimer, the term of this patent is extended or adjusted under 35 U.S.C. 154(b) by 29 days.

(21) Appl. No.: 10/848,165

(22) Filed: May 19, 2004

(65) Prior Publication Data
US 2005/0258145 A1    Nov. 24, 2005

(51) Int. Cl.
*B23K 11/16* (2006.01)
(52) U.S. Cl. ........................ 219/118; 428/653
(58) Field of Classification Search .............. 219/118, 219/117.1, 119, 76.17, 85.16, 86.1, 86.25, 219/91.2; 427/318, 319; 428/653, 570, 659
See application file for complete search history.

(56) References Cited

U.S. PATENT DOCUMENTS

| 3,615,368 | A | * | 10/1971 | Baumel | 420/44 |
| 4,546,051 | A | * | 10/1985 | Uchida et al. | 428/653 |
| 5,302,797 | A | * | 4/1994 | Yasuyama et al. | 219/118 |
| 5,454,887 | A | * | 10/1995 | Fukui | 148/603 |
| 5,783,794 | A | * | 7/1998 | Oikawa et al. | 219/118 |
| 5,789,089 | A | * | 8/1998 | Maki et al. | 428/623 |
| 6,361,881 | B1 | * | 3/2002 | Izaki et al. | 428/626 |
| 6,369,347 | B1 | * | 4/2002 | Zhao et al. | 219/118 |
| 6,673,472 | B2 | * | 1/2004 | Maki et al. | 428/653 |
| 2005/0230012 | A1 | * | 10/2005 | Usami et al. | 148/648 |

FOREIGN PATENT DOCUMENTS

| JP | 04-251676 | * | 8/1992 |
| JP | 4-251676 |  | 9/1992 |

(Continued)

*Primary Examiner*—Kevin P Kerns
*Assistant Examiner*—Michael Aboagye
(74) *Attorney, Agent, or Firm*—Oblon, Spivak, McClelland, Maier & Neustadt, P.C.

(57) ABSTRACT

A joined part of an aluminum-coated steel sheet and an aluminum sheet is composed of an intermetallic compound layer which exists in a region in which a part of a coated layer exists before the joining and an aluminum melted and solidified part which also exists on the side of the aluminum sheet to enclose the intermetallic compound layer. The atoms existing on the surface of the aluminum melted and solidified part are intermetallic-bonded with atoms which exist on the surface of the steel sheet except in the region in which the intermetallic compound layer exists seen in the plan view. Further, the area of the intermetallic compound layer is limited to 60% or less of the total area of the joined part at the interface between the aluminum-coated steel sheet and the aluminum sheet. Thus, the area of the aluminum melted and solidified part exceeds 40% of the total area of the joined part. The strong joining having a high fracture energy can be provided at a high efficiency.

3 Claims, 3 Drawing Sheets

FOREIGN PATENT DOCUMENTS

| | | | |
|---|---|---|---|
| JP | 04-251676 | * | 9/1992 |
| JP | 4-253578 | | 9/1992 |
| JP | 7-24581 | | 1/1995 |
| JP | 07-024581 | * | 1/1995 |
| JP | 9-176816 | | 7/1997 |
| JP | 11-342477 | | 12/1999 |

* cited by examiner

WELDMENT OF DIFFERENT MATERIALS AND RESISTANCE SPOT WELDING METHOD

BACKGROUND OF THE INVENTION

1. Field of the Invention

The present invention relates to a weldment of different materials comprising an aluminum or aluminum alloy (hereinafter both of which are referred to as "aluminum") sheet and an aluminum-coated steel sheet, and a method of resistance spot welding the weldment.

2. Description of the Related Art

Aluminum is widely used for vehicles and automobiles as light-weight structural materials. Due to various factors including costs, strength and stiffness, aluminum is often used in combination with a steel sheet. The steel sheet is typically joined to each other using resistance spot welding in a simply way. Also, it is required to resistance spot weld aluminum with a steel sheet to provide a joined material.

It is conventionally known that when an aluminum sheet and a steel sheet are directly resistance spot welded, a hard and brittle intermetallic compound is produced at an interface between the aluminum sheet and the steel sheet, resulting in a joined material having a significantly decreased strength.

In order to provide sufficient strength, a coating layer is formed on a steel sheet as disclosed, for example, in Japanese Unexamined Patent Application Publication No. 4-251676.

Also, an insert material is interposed between an aluminum sheet and a steel sheet, and they are resistance spot welded as disclosed in, for example, Japanese Unexamined Patent Application Publication No. 4-253578.

However, the strength is not sufficient after joining, although the coating layer is formed on the steel sheet. In addition, even if the strength is sufficient, the fracture energy is low, whereby no joined material suitable for use in structures such as vehicles and automobiles can be provided.

The resistance spot welding using the insert material is insufficient and not suitable for a large number of joinings.

SUMMARY OF THE INVENTION

Accordingly, it is an object of the present invention to provide a weldment of different materials and a method of resistance spot welding in which a strong joining having a high fracture energy is provided at a high efficiency.

One aspect of the present invention provides a weldment of different materials comprising an aluminum or aluminum alloy sheet and an aluminum-coated steel sheet that are resistance spot welded, wherein a joined part exists on an interface between the aluminum or aluminum alloy sheet and the aluminum-coated steel sheet, and wherein the area of an intermetallic compound layer in the joined part is 60% or less of the total area of the joined part constituting of the intermetallic compound layer and the melted and solidified region by the resistance spot welding.

In the weldment of different materials according to the present invention, the aluminum-coated steel sheet comprises a steel substrate containing 0.002% by mass or more of N.

In addition, in the weldment of different materials according to the present invention, the aluminum-coated steel sheet comprises an aluminum-coated layer containing 5% by mass or more of Si.

Furthermore, in the weldment of different materials according to the present invention, the aluminum-coated steel sheet comprises an aluminum-coated layer having a thickness of 15 µm or more.

Another aspect of the present invention provides a method of resistance spot welding a weldment of different materials comprising an aluminum or aluminum alloy sheet and an aluminum-coated steel sheet according to the present invention comprising the steps of pressing the aluminum-coated steel sheet against an electrode chip at an anode, and pressing the aluminum or aluminum alloy sheet against an electrode chip at a cathode side using a DC or capacitor type welding machine.

According to the present invention, the area of the intermetallic compound layer formed at the interface is adequately defined based on the total area of the weldment, thereby providing the strong weldment having a high ductile fracture energy.

The above-mentioned aluminum-coated steel sheet comprises a steel substrate and an aluminum-coated layer or an aluminum alloy coated layer formed thereon.

When a DC or capacitor type welding machine is used, the aluminum-coated steel sheet is pressed against an electrode chip at an anode, and the aluminum or aluminum alloy sheet is pressed against an electrode chip at a cathode side, thereby ensuring an area percentage.

It is preferable that the aluminum-coated steel sheet comprises an aluminum-coated layer containing 5% by mass or more of Si, the aluminum-coated steel sheet comprises an aluminum-coated layer having a thickness of 15 µm or more, and the aluminum-coated steel sheet comprises a steel substrate containing 0.002% by mass or more of N.

As described above, according to the present invention, the area of the intermetallic compound layer formed at the interface between the aluminum or aluminum alloy sheet and the aluminum-coated steel sheet is adequately defined based on the total area of the weldment, thereby providing the strong weldment having a high ductile fracture energy.

DETAILED DESCRIPTION OF THE PREFERRED EMBODIMENTS

Figure 1:
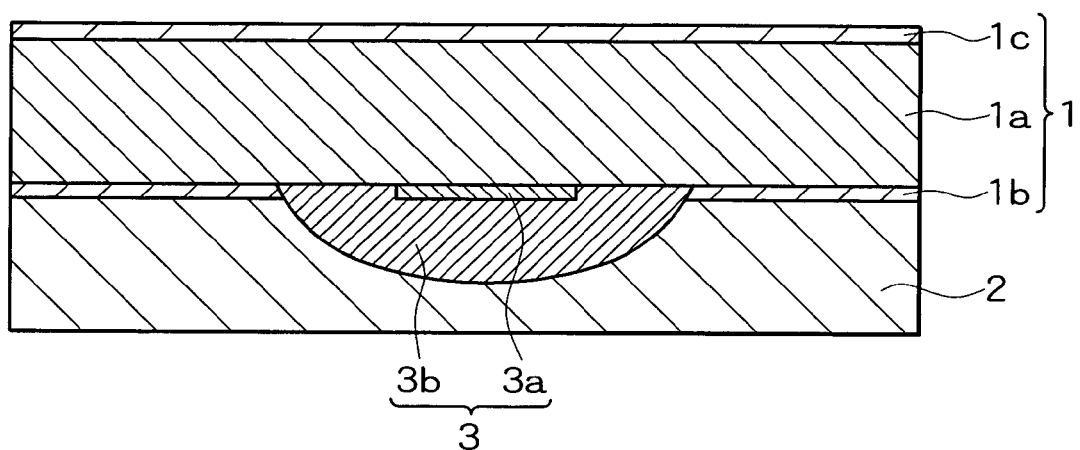
FIG. 1 is a sectional view showing a weldment of different materials according to an embodiment of the present invention.
Figure 2:
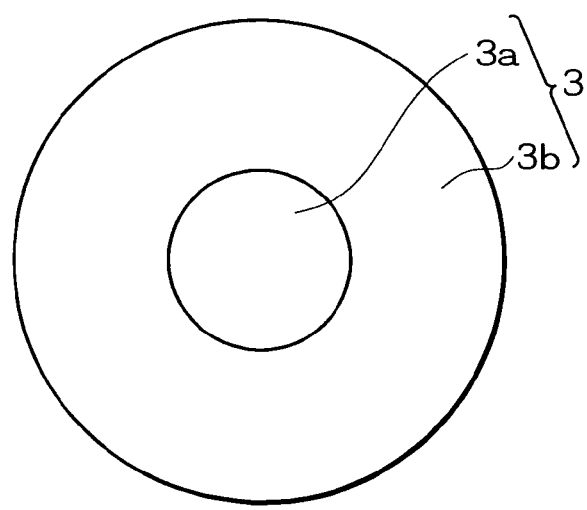
FIG. 2 is a schematic view showing a joined part 3 at the interface between an aluminum-coated steel sheet 1 and an aluminum sheet 2.

Referring to the attached drawings, preferable embodiments of the weldment of different materials according to the present invention will be described in detail. FIG. 1 is a sectional view showing a weldment of different materials according to an embodiment of the present invention. FIG. 2 is a schematic view showing a joined part 3 at the interface between an aluminum-coated steel sheet 1 and an aluminum sheet 2.

In this embodiment, the aluminum-coated steel sheet 1 is joined on the aluminum sheet 2 by resistance spot welding. Aluminum-coated layers 1b and 1c are formed on both surfaces of a steel substrate 1a of the aluminum-coated steel sheet 1. Intermetallic compound layers consisted of an Al—Fe composition and the like (not shown) exist on interfaces between the coated layer 1b and the steel sheet 1a, and between the coated layer 1c and the steel sheet layer 1a before the aluminum-coated steel sheet 1 is joined with the aluminum sheet 2.

A joined part 3 of the aluminum-coated steel sheet 1 and the aluminum sheet 2 includes an intermetallic compound layer 3a and an aluminum melted and solidified part 3b. The intermetallic compound layer 3a is formed on a part of the coated layer 1b before joining. The aluminum melted and solidified part 3b is formed within the aluminum sheet 2, and surrounds the intermetallic compound layer 3a. The atoms existing on the surface of the aluminum melted and solidified part 3b are metallic-bonded with atoms which exist on the surface of the steel sheet 1 except in the region in which the intermetallic compound layer 3a exists seen in the plan view. In other words, the intermetallic compound consisted of the Al—Fe composition and the like that exists before the joining disappears in the region where the aluminum melted and solidified part 3b and the steel sheet 1 are directly contacted. The intermetallic compound layer 3a is the intermetallic compound that exists before the joining or is newly developed upon the joining.

In this embodiment, the area of the intermetallic compound layer 3a at the interface between the aluminum-coated steel sheet 1 and the aluminum sheet 2 is limited to 60% or less of the total area of the joined part 3 constituting of the intermetallic compound layer 3a and the aluminum melted and solidified part 3b. Accordingly, the area of the aluminum melted and solidified part 3b exceeds 40% of the total area of the joined part 3.

According to this embodiment, the aluminum sheet 2 and the steel sheet 1 are intermetallic bonded over a wide area, resulting in a strong joining having a high fracture energy, even if no insert material is used.

A method of resistance spot welding the weldment of different materials described above will be described. The present inventor found that positive charges flow into the joining material from an electrode chip to produce deviations of the heat generations on the joining material in the resistance spot welding, and that when the deviations of the heat generations on the aluminum sheet 2 is produced at one welding point, the aluminum sheet 2 is molten intensively to produce a large amount of the intermetallic compound, whereby the percentage of the area of the intermetallic compound layer 3a that occupies the joining part 3 is increased. It is therefore required to avoid excessive heating of the aluminum sheet 2. In the resistance spot welding method, any of an AC, DC or capacitor type welding machine can be used.

Figure 3A:
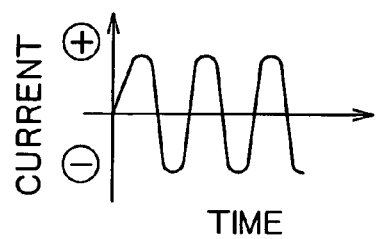
FIG. 3A shows a current waveform in a single-phase AC type welding machine.
Figure 3B:
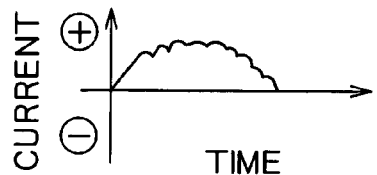
FIG. 3B shows a current waveform on welding points in odd numbers in a three-phase low frequency type welding machine.
Figure 3C:
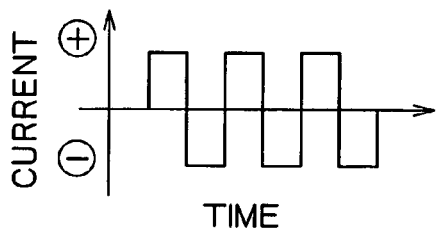
FIG. 3C shows a current waveform in an inverter (AC) type welding machine.

A method of resistance spot welding using the AC type welding machine will be described. FIG. 3A shows a current waveform in a single-phase AC type welding machine. FIG. 3B shows a current waveform on welding points in odd numbers in a three-phase low frequency type welding machine. FIG. 3C shows a current waveform in an inverter (AC) type welding machine.

In the single-phase AC or the inverter type welding machine, a positive current flows alternatively through a positive electrode chip and a negative electrode chip, as shown in FIGS. 3A and 3C. Accordingly, the electrode chips having either polarity can be pressed against the aluminum-coated steel sheet 1 and the aluminum sheet 2, since no deviations of the heat generations are produced.

In the three-phase low frequency type welding machine, a positive current flows at a positive electrode on welding points in odd numbers as shown in FIG. 3b, and a positive current flows at a negative electrode on welding points in even numbers (not shown). If the negative electrode chip is pressed against the aluminum-coated steel sheet 1 on the welding points in odd numbers and the positive electrode chip is pressed against the aluminum sheet 2 using the three-phase low frequency type welding machine, the deviations of the heat generations are produced on the aluminum sheet 2, as described above. As a result, no desired weldment can be provided. The same applies to the case that the positive electrode chip is pressed against the aluminum-coated steel sheet 1 on the welding points in even numbers and the negative electrode chip is pressed against the aluminum sheet 2. Accordingly, the polarity of the electrode chip should be changed per one welding point, when the three-phase low frequency type welding machine is used.

Figure 4A:
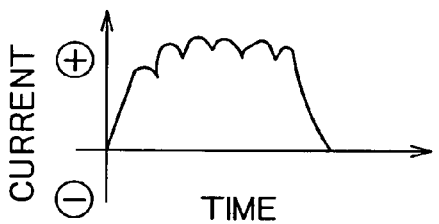
FIG. 4A shows a current waveform in a single-phase rectifier type welding machine.
Figure 4B:
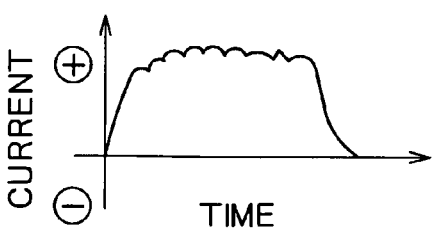
FIG. 4B shows a current waveform in a three-phase rectifier type welding machine.
Figure 4C:
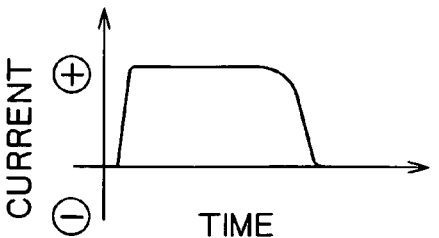
FIG. 4C shows a current waveform in an inverter (DC) type welding machine.

A method of resistance spot welding using the DC type welding machine will be described. FIG. 4A shows a current waveform in a single-phase rectifier type welding machine. FIG. 4B shows a current waveform in a three-phase rectifier type welding machine. FIG. 4C shows a current waveform in an inverter (DC) type welding machine.

In the single-phase rectifier, three-phase rectifier, or the inverter type welding machine using the DC current, the positive current flows only on the positive electrode chip as shown in FIGS. 4A to 4C. Accordingly, it is required to press the positive electrode chip to the aluminum-coated steel sheet 1 and to press the negative electrode chip to the aluminum sheet 2.

Figure 5:
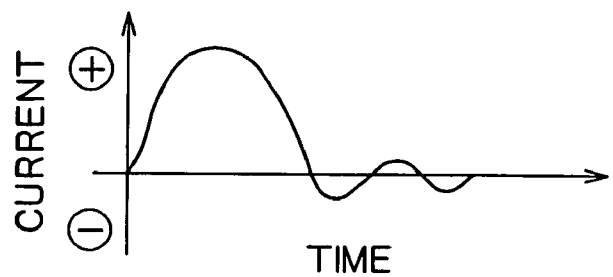
FIG. 5 shows a current waveform in a capacitor type welding machine.

A method of resistance spot welding using the capacitor type welding machine will be described. FIG. 5 shows a current waveform in a capacitor type welding machine. In the capacitor type welding machine, the positive charges stored on the capacitor flow to the positive electrode chip at an initial pulse, and then attenuate. Accordingly, when the positive electrode chip is pressed to the aluminum-coated steel sheet 1 and the negative electrode chip is pressed to the aluminum sheet 2, the deviations of the heat generations is produced on the aluminum-coated steel sheet 1, whereby the production of a large amount of the intermetallic compound can be avoided.

The causes of the numerical limitations to the shape and the composition of the joined material will be described.

According to the present invention, the aluminum-coated layer contains 5% by mass or more of Si. If the aluminum-coated layer contains less than 5% by mass of Si, the amount of the intermetallic compound may be increased in the joined part. Although the composition of the aluminum-coated layer is not especially limited, the aluminum-coated layer desirably contains 5% by mass or more of Si.

According to the present invention, the aluminum-coated layer has a thickness of 15 μm or more. If the aluminum-coated layer has a thickness of less than 15 μm, the amount of the intermetallic compound may be increased in the joined part. Although the thickness of the aluminum-coated layer is not especially limited, the aluminum-coated layer desirably has a thickness of 15 μm or more.

According to the present invention, the aluminum-coated steel sheet comprises a steel substrate containing 0.0020 to 0.0200% by mass of N. If the steel substrate contains less than 0.0020% by mass of N, the amount of the intermetallic compound may be increased in the joined part. If the steel substrate contains more than 0.0200% by mass of N, the strength in the joining is not improved. Although the composition of the aluminum-coated layer is not especially limited, the aluminum-coated steel sheet desirably comprises a steel substrate containing 0.0020 to 0.0200% by mass or more of N.

Non-limiting examples of the aluminum material include 1000, 3000, or 5000 series aluminum or aluminum alloy.

As defined in the present invention, in order to limit the area of the intermetallic compound layer to 60% or less of the total area of the joined part at the interface between the aluminum-coated steel sheet and the aluminum sheet, it is thus required to adequately select the resistance spot welding method and the shape and the composition of the joined material. As to the composition of the joined material, the aluminum-coated steel sheet comprises a steel substrate containing as high as 0.002% by mass or more of N.

Examples of the weldment of different materials according to the present invention and comparative examples will be described below.

Joined bodies of different materials having various area percentages were produced by joining aluminum-coated steel sheets with JIS5056Al alloy plates shown in Table 1 under controlled welding current and time conditions using a resistance spot welding method. The area percentage herein refers to the percentage of the area of the intermetallic compound layer to the area of the joined part. Each of the aluminum-coated steel sheet and the Al alloy plate had a thickness of 1.0 mm.

TABLE 1

| | | Aluminum-coated Steel Sheet | | | | | |
|---|---|---|---|---|---|---|---|
| | | Al Coated Layer | | N Content in | | Polarity at | Area |
| | No | Si Content (% by mass) | Thickness (μm) | Steel Substrate (% by mass) | Welding Machine | Steel Sheet Side | Percentage (%) |
| Example | 1 | 10 | 40 | 0.012 | DC | + | 20 |
| | 2 | 10 | 40 | 0.012 | DC | + | 35 |
| | 3 | 10 | 40 | 0.012 | DC | + | 45 |
| | 4 | 10 | 40 | 0.012 | DC | + | 60 |
| | 5 | 13 | 40 | 0.012 | DC | + | 24 |
| | 6 | 10 | 40 | 0.012 | DC | + | 24 |
| | 7 | 7 | 40 | 0.012 | DC | + | 50 |
| | 8 | 4 | 40 | 0.012 | DC | + | 60 |
| | 9 | 12 | 40 | 0.012 | DC | + | 28 |
| | 10 | 10 | 32 | 0.012 | DC | + | 35 |
| | 11 | 9 | 25 | 0.012 | AC | None | 47 |
| | 12 | 9 | 15 | 0.012 | DC | + | 55 |
| | 13 | 9 | 13 | 0.012 | DC | + | 58 |
| | 14 | 10 | 40 | 0.012 | DC | + | 59 |
| | 15 | 10 | 40 | 0.001 | DC | + | 59 |
| Comparative Example | 16 | 10 | 40 | 0.012 | DC | + | 70 |
| | 17 | 10 | 40 | 0.012 | DC | + | 65 |
| | 18 | 10 | 40 | 0.012 | DC | + | 75 |

Figure 6:
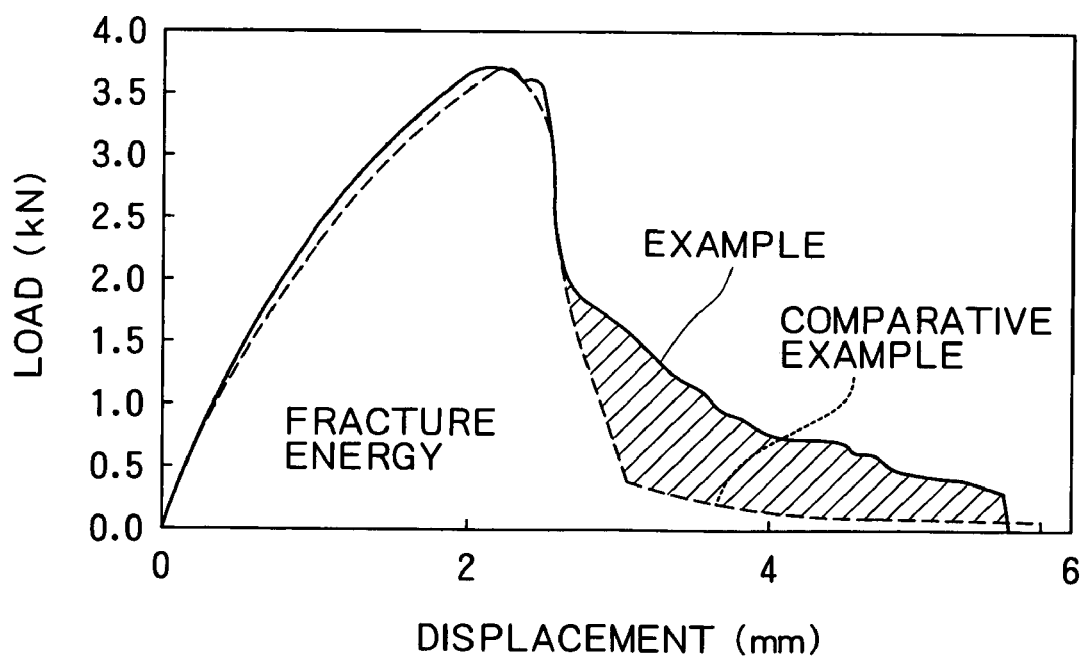
FIG. 6 is a graph showing a load—displacement curve where the displacement is on the abccissa and the load is on the ordinate in Example 1 and Comparative Example 18.

Respective joined bodies were tested for shear tension. Based on the resultant load—displacement curve, ductile fracture energy was determined by the energy required for fracture each weldment. The results are shown in Table 2. In Table 2, the ductile fracture energy of 8 J or more is excellent, 7.7 J or more but less than 8 J is good, 7.5 J or more but less than 7.7 J is fair, and less than 7.5 J is not good. FIG. 6 is a graph showing a load—displacement curve where the displacement is on the abccissa and the load is on the ordinate in Example 1 and Comparative Example 18. In FIG. 6, the solid line represents the result in Example 1, and the broken line represents the results in Comparative Example 18.

TABLE 2

| | No. | Broken Part | Ductile Fracture Energy |
|---|---|---|---|
| Example | 1 | Base Material Broken | Excellent |
| | 2 | Base Material Broken | Excellent |
| | 3 | Base Material Broken | Good |
| | 4 | Base Material Broken | Fair |
| | 5 | Base Material Broken | Excellent |
| | 6 | Base Material Broken | Excellent |
| | 7 | Base Material Broken | Good |
| | 8 | Base Material Broken | Fair |
| | 9 | Base Material Broken | Excellent |
| | 10 | Base Material Broken | Good |
| | 11 | Base Material Broken | Good |
| | 12 | Base Material Broken | Good |
| | 13 | Base Material Broken | Fair |
| | 14 | Base Material Broken | Good |

TABLE 2-continued

| | No. | Broken Part | Ductile Fracture Energy |
|---|---|---|---|
| | 15 | Base Material Broken | Fair |
| Comparative Example | 16 | Base Material Broken | Not Good |
| | 17 | Interface Broken | Not Good |
| | 18 | Interface Broken | Not Good |

As shown in Table 2, in Examples 1 to 15, the weldments had the area percentages of 60% or less, had high ductile fracture energy as high as 7.5 J or more, and had broken base materials. The weldment in Example 8 had lower ductile fracture energy, since the aluminum-coated layer contained less than 5% by mass of Si. The weldment in Example 13 had lower ductile fracture energy, since the aluminum-coated layer had a thickness of less than 15 μm. The weldment in Example 15 had lower ductile fracture energy, since the steel substrate contained less than 0.002% by mass of N.

In contrast, in Comparative Examples 16 to 18, the joined bodies had the area percentages exceeding the upper limit defined by the present invention and therefore had low ductile fracture energy. In particular, in Comparative Examples 17 and 18, the joined bodies had broken interfaces.

Differences in the ductile fracture energy between the joined bodies in Examples and Comparative Examples are represented by a hatching region in FIG. 6.

What is claimed is:

1. A weldment of different materials, the weldment having a ductile fracture energy of at least 7.5 Joules, comprising:
    an aluminum or aluminum alloy sheet and an aluminum-coated steel sheet having an aluminum coated layer with a thickness of 15 μm or more, said aluminum or aluminum alloy sheet and said aluminum-coated steel sheet being resistance spot welded,
    wherein a joined part exists on an interface between the aluminum or aluminum alloy sheet and the aluminum-coated steel sheet, and wherein the area of an intermetallic compound layer in the joined part is 60% or less of the total area of the joined part constituting the intermetallic compound layer and the melted and solidified region created by the resistance spot welding,
    wherein the aluminum-coated steel sheet comprises a steel substrate containing 0.002% by mass or more of N.

2. A weldment of different materials according to claim 1, wherein the aluminum-coated steel sheet comprises an aluminum-coated layer containing 5% by mass or more of Si.

3. A method of resistance spot welding the weldment of different materials comprising an aluminum or aluminum alloy sheet and an aluminum-coated steel sheet according to claim 1, comprising the steps of pressing the aluminum-coated steel sheet against an electrode chip at an anode, and pressing the aluminum or aluminum alloy sheet against an electrode chip at a cathode side using a DC or capacitor type welding machine.

* * * * *